United States Patent [19]
Ohnishi

[11] Patent Number: 5,689,163
[45] Date of Patent: Nov. 18, 1997

[54] MOTOR CONTROLLER

[75] Inventor: Yasuyuki Ohnishi, Kyoto, Japan

[73] Assignee: Rohm Co. Ltd., Kyoto, Japan

[21] Appl. No.: 547,237

[22] Filed: Oct. 24, 1995

[30] Foreign Application Priority Data

Oct. 25, 1994 [JP] Japan ................................. 6-259962

[51] Int. Cl.$^6$ .................................................. G05B 19/29
[52] U.S. Cl. .......................... 318/603; 318/608; 318/432; 318/606; 328/812; 328/912
[58] Field of Search ........................ 318/432, 434, 318/600–603, 604–608, 560, 563, 565, 569, 611, 632; 388/809–815, 912, 930

[56] References Cited

U.S. PATENT DOCUMENTS

| | | | |
|---|---|---|---|
| 4,543,516 | 9/1985 | Kobori et al. | 388/813 |
| 4,710,825 | 12/1987 | Oita et al. | 318/318 |
| 4,819,087 | 4/1989 | Takeuchi et al. | 360/14.3 |
| 4,823,207 | 4/1989 | Kobayashi et al. | 360/32 |
| 5,023,924 | 6/1991 | Tajima et al. | 318/254 |
| 5,220,551 | 6/1993 | Tateishi et al. | 369/50 |
| 5,239,245 | 8/1993 | Lee | 318/567 |
| 5,298,841 | 3/1994 | Katayama et al. | 318/254 |

*Primary Examiner*—David S. Martin
*Attorney, Agent, or Firm*—Nikaido Marmelstein Murray & Oram LLP

[57] ABSTRACT

A motor controller of the present invention has a frequency generator which outputs, in accordance with a rotation of the motor, a predetermined number of rotational signals every time the motor makes one rotation. A period signal representative of the period of the rotational signals is calculated, and the period signal and a predetermined value are subtracted to obtain a speed error signal. The error signal is stored at a predetermined address of a memory. A filter which performs filtering by use of a plurality of error signals in the memory and a subtracter which subtracts the error signals and the contents of the memory are provided. A selecting circuit outputs the error signal when the error signal is outside a predetermined range and outputs an output of the filter when the error signal is within the predetermined range. Thereafter, the selecting circuit outputs an output signal of the subtracter. A control signal is produced from an output of the selecting circuit. The driving torque of the motor is varied in accordance with the control signal.

5 Claims, 4 Drawing Sheets

MOTOR CONTROLLER

BACKGROUND OF THE INVENTION

1. Field of the Invention

The present invention relates to a motor controller, and more particularly, to a motor controller having a frequency generator and suitable for controlling the speed of a motor based on an output of the frequency generator.

2. Description of the Prior Art

In recent years, motors have increasingly been controlled by software. This is because in view of users' demands for low price, repletion of additional functions and size reduction, the use of software is more advantageous in price reduction than providing hardware exclusively for each function since the overlapping of hardware can be prevented, and more functions can be provided to the products with the same cost.

Moreover, the repletion of additional functions, which is frequently controlled by users' instructions, is difficult to realize with only a control processor which controls the mechanism. Therefore, this is typically realized by a control by a microcomputer called system controller which performs a superior communications function.

Further, since the diameters of motors are smaller because of the size reduction, it is difficult to obtain a moment of inertia enough to sufficiently restrain the variation in load, and the magnetic pattern of the frequency generator used for motor speed control which should be accurate is so minute that it is largely affected by a magnetic error (magnetic non-uniformity).

For example, the speed of a drum servo for a video cassette recorder is controlled based on a pulse-to-pulse distance obtained based on a rise or a fall of an FG pulse. Ideally, the distances between FG pulses are equal. However, as mentioned above, the distances slightly differ because of the magnetic non-uniformity. Even if the motor is stably driven by converting the distance (in another word, period, and therefore, frequency by the period) into a speed, a voltage waveform affected by the magnetic non-uniformity occurs every PG pulse period.

To remove this, a hardware filter has been inserted in a speed servo system. However, this solution is defective since the responsibility of servo control is deteriorated by the insertion of the filter. To solve this problem, so-called learning control has increasingly been used.

For example, Japanese Laid-open Patent Application No. S64-26385 discloses a motor controller using the learning control. Referring to FIG. 1, there is shown a block diagram of the conventional motor controller using the learning control. This motor controller is an application to the rotation control of a cylinder motor (a motor for rotating a rotary head) of a video cassette recorder.

Reference numeral 1 represents a cylinder motor. Reference numeral 2 represents a positional signal producer (hereinafter, referred to as "PG") which outputs one pulse every time the motor 1 makes one rotation. Reference numeral 4 represents a frequency generator (hereinafter, referred to as "FG") which outputs a plurality of detection pulses of the speed of the motor 1 every rotation. That is, frequency signals of pulses in accordance with an angle corresponding to an angle obtained by dividing the one rotation of the motor into at least four equal parts is outputted. Reference numerals 3 and 5 represent comparators which binarize the outputs of the PG 2 and the FG 4, respectively. Reference numeral 6 represents a servo microcomputer. Reference numeral 17 represents a driving circuit which drives the motor 1.

An operation of the conventional motor controller thus arranged will be described. The phase of a PG signal $S_{PG}$ which is an output of the PG 2 binarized by the comparator 3 is compared with the phase of a reference frequency signal inputted from a terminal 8 at a phase error signal producer 7 to produce a phase error signal. The phase error signal is transmitted to an adder 16.

An output of the FG 4 is binarized into an FG signal $S_{FG}$ by the comparator 5 and transmitted to a speed non-uniformity detector 9 and to a corrector 12. At the time of starting of the motor 1, the corrector 12 is not operating, and an output of the speed non-uniformity detector 9 goes through a speed error signal producer 13 to be inputted to a gain changer 14 and is added to the phase error signal at the adder 16. Then, a driving torque is supplied to the motor 1 by the driving circuit 17.

At the time of the starting, the gain of the gain changer 14 is set to ¼ to ½ the steady-state gain so that the rotation of the motor 1 is not readily affected by the above-mentioned magnetic error. Specifically, the gain is reduced to a degree where the magnetic non-uniformity components are ignorable so that the motor 1 runs stably, and the average of the distances between a plurality of FG signals $S_{FG}$ produced between the PGs are totaled to obtain the average value. Then, the difference between the average value and each distance is stored in a memory 11.

In the steady state, the gain of the gain changer 14 is increased to one. Every FG signal $S_{FG}$, the corrector 12 subtracts a value stored in the memory 11 from the detection value. The output of the corrector 12 is supplied to the speed error signal producer 13 to produce a speed error signal. The speed error signal is transmitted by way of the gain changer 14 to the driving circuit 17. As mentioned above, the gain of the gain changer 14 is one. Motor control which is not readily affected by the magnetic error is thus performed.

In the above-described conventional arrangement, however, since the control gain is reduced to ¼ to ½ at the time of starting of the motor, the starting torque is small, so that the starting takes a long time. Further, if the motor is affected by disturbance in the learning process, a learning value affected by the disturbance is stored, so that the learning process is no more effective.

SUMMARY OF THE INVENTION

An object of the present invention is to provide a motor controller which enables a high-speed starting and with which a stable learning value is obtained even if the controller is affected by disturbance during learning.

A motor controller of the present invention is provided with the following: a motor; frequency generating means for outputting, in accordance with a rotation of the motor, a predetermined number of rotational signals every time the motor makes one rotation; period counting means for counting a period of the rotational signals to output a period signal; error detecting means for subtracting the period signal and a predetermined value to output an error signal; storing means for storing the error signal at a predetermined address; filter means for performing filtering by use of a plurality of error signals in the storing means; subtracting means for subtracting a presently detected error signal and the error signal stored in the storing means; selecting means for outputting the error signal when the error signal is outside a predetermined range and outputting an output signal of the filter means when the error signal is within the predetermined range, said selecting means thereafter outputting an output signal of the subtracting means; controlling means for producing a control signal from an output of the selecting means; and driving means for varying a driving torque of the motor in accordance with the control signal.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
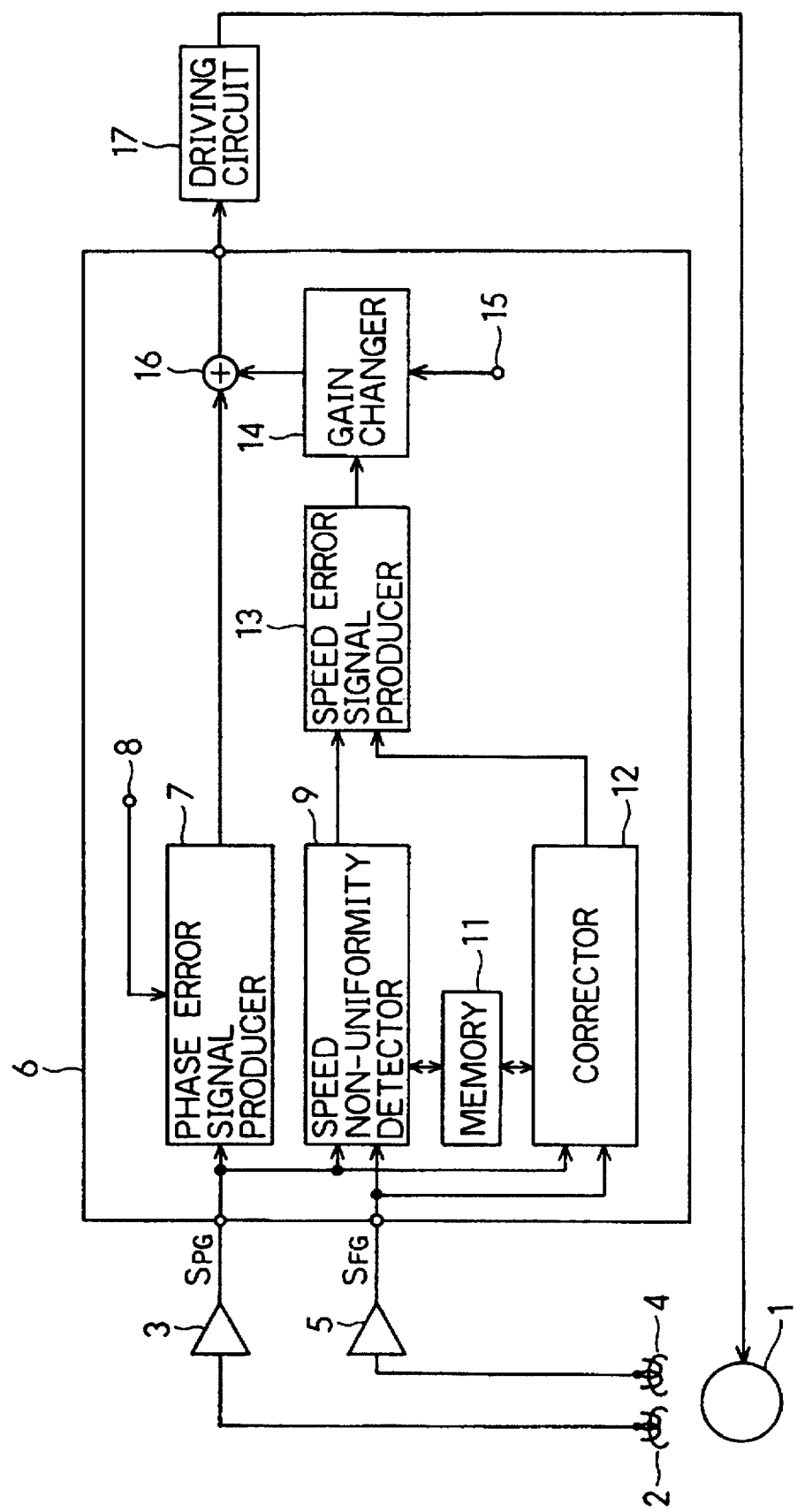
FIG. 1 is a block diagram of a conventional motor controller.
Figure 2:
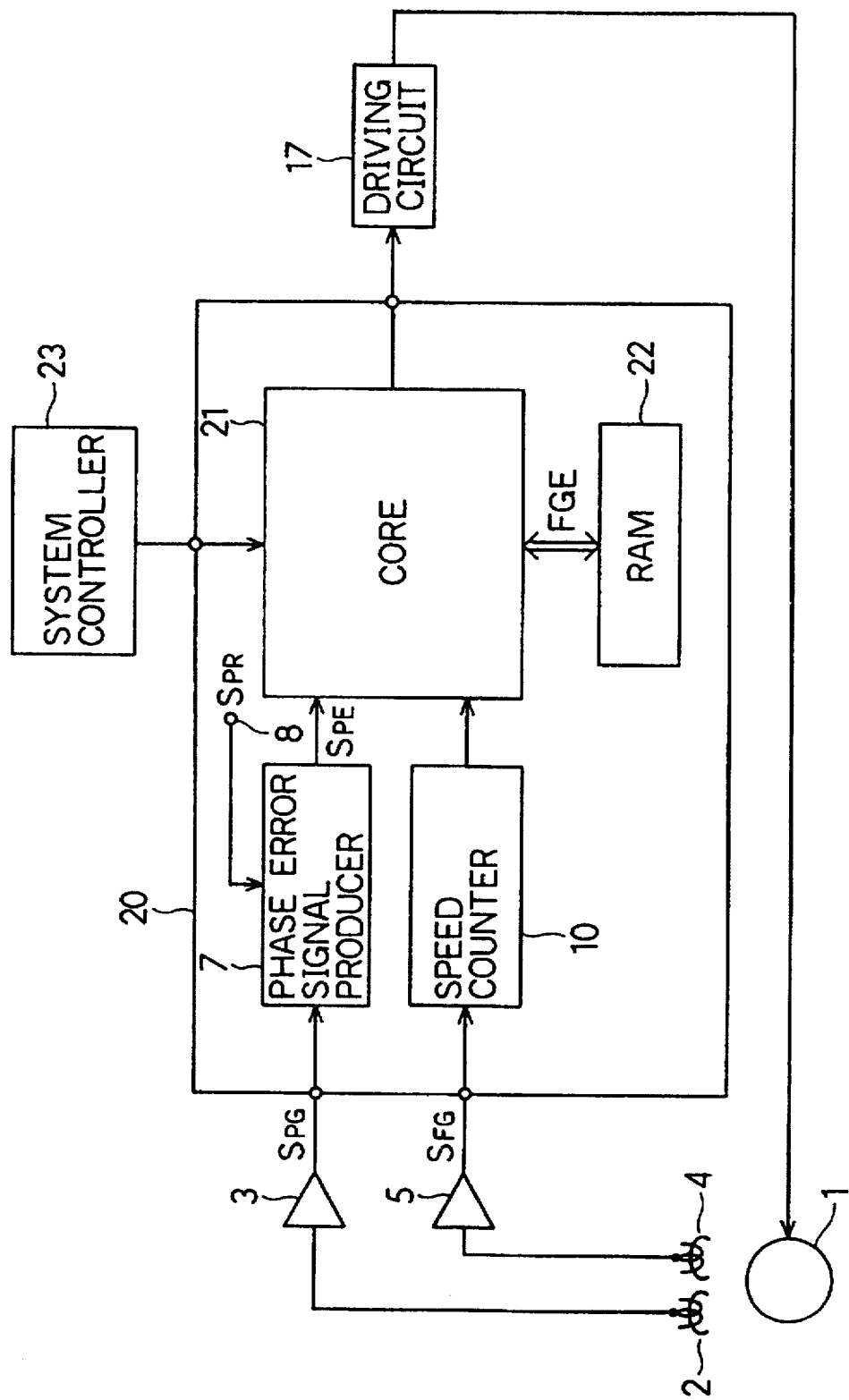
FIG. 2 is a block diagram of a motor controller embodying the present invention.

Hereinafter, an embodiment of the present invention will be described with reference to the drawings. Referring to FIG. 2, there is shown a block diagram of a motor controller embodying the present invention. In this embodiment, a motor 1, a PG 2, an FG 4, comparators 3 and 5 and a driving circuit 17 are the same as those of the conventional controller of FIG. 1 and will not be described in detail. The remarkable difference from the conventional controller lies in an internal processing by a control processor 20 which newly incorporates a speed counter 10 and a random access memory (RAM) 22.

A core 21 has a central processing unit (CPU) and performs a control operation to be described later. Reference numeral 23 represents a system controller which performs various controls for a video tape recorder (VTR). In this embodiment, the system controller 23 provides the core 21 with a command SL to be described later. Instead of this arrangement, the system controller may serve also as the core 21. Then, the hardware structure is simplified and the command SL is generated by the core 21.

Figure 3:
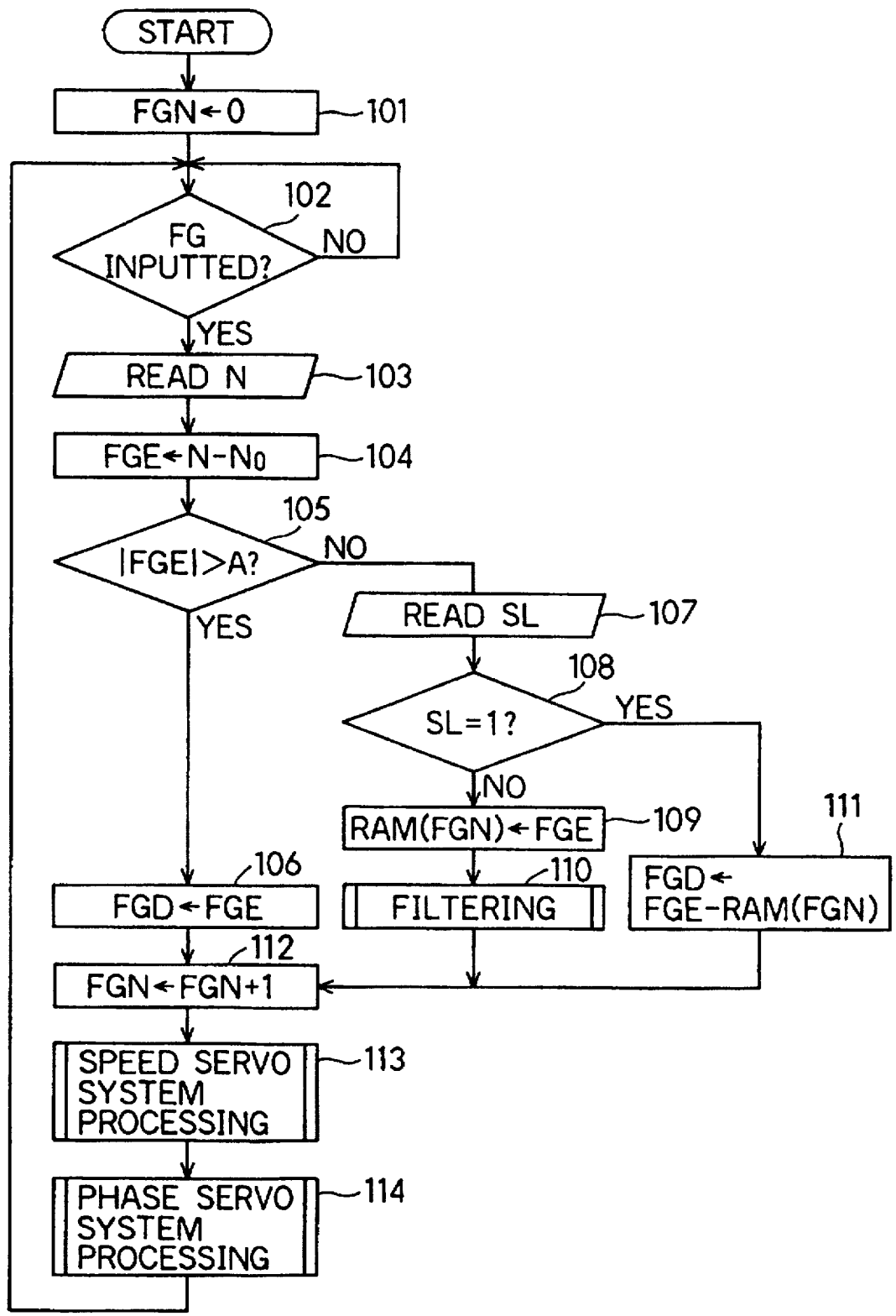
FIG. 3 is a flowchart of an operation performed by the motor controller.

An operation of the motor controller of the present invention thus arranged will be described with reference to a flowchart of FIG. 3.

Figure 4:
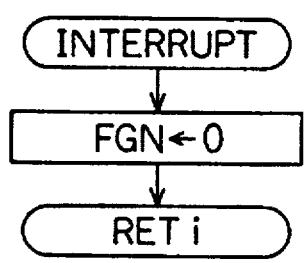
FIG. 4 is a flowchart of an operation performed by the motor controller.

First, at step 101, an ordinal number FGN constituting a software counter is set to 0. As shown in FIG. 4, an interrupt is generated every time the PG signal $S_{PG}$ is inputted to set the ordinal number FGN to 0. That is, the ordinal number FGN is reset to 0 every time the motor 1 makes one rotation. The ordinal number FGN represents the order of the FG signal from the start of the PG signal. The processing from the next step 102 is performed every time the FG signal $S_{FG}$ is inputted.

At step 102, the process waits until the FG signal $S_{FG}$ is inputted and proceeds to the next step 103 when the FG signal $S_{FG}$ is inputted. At step 103, a speed measurement value N is read in. The speed measurement value N is obtained by measuring the pulse duration of the FG signal $S_{FG}$ with the speed counter 10 by using a crystal oscillation output. As shown in FIG. 2, the speed counter 10 is typically provided outside a core 21 in the control processor 20 as exclusively used hardware.

Then, at step 104, a target speed value $N_O$ is subtracted from the measurement value N to thereby detect a rotation speed deviation. The deviation is outputted as an error signal FGE. At step 105, whether the absolute value of the error signal FGE is greater than a predetermined value A or not is determined. When the absolute value of the error signal FGE is greater than the value A, the error signal FGE is replaced by a speed driving data FGD and outputted (step 106). Consequently, for example, when the motor 1 is accelerated from the stationary state like the time of starting, the motor speed is rapidly increased since the error in speed is remarkable. This applies to a case in which the motor 1 is unintentionally accelerated because of disturbance or a like factor.

Then, the ordinal number FGN is incremented by one at step 112, and a speed system processing is executed at step 113. In the speed system processing, for example, processings of a low-pass compensating filter and a ripple filter, and a multiplication of a speed control gain are performed. Then, a phase servo system processing is executed at step 114 and the process returns to step 102. In the phase servo system processing, only the result of the speed servo system processing is transmitted to the driving circuit 17 since the error in speed is remarkable.

When the absolute value of the error signal FGE is smaller than the value A, the processing of step 107 is executed to read in a command SL from the system controller 23. The command SL is for commanding acquirement and use of the learning. SL=0 commands acquirement and SL=1 command use. For example, since the acquirement of learning has not been made just after the completion of the above-described starting processing, the logic of the external command SL is 0. This is determined at step 108 and the processing of step 109 is executed.

At step 109, the error signal FGE is stored at an address of the RAM 22 indicated by the ordinal number FGN. Then, at step 110, filtering is performed. The filtering performed here is realized by preparing N data and obtaining their simple average. The expression of the filtering is given by the following expression (1):

$$FGD = \frac{1}{N} \sum_{K=1}^{N} RAM(K) \quad (1)$$

where RAM(K) is the Kth storage value of the RAM 22.

When the expression (1) is z-converted, its transfer function G(z) is given by the following expression (2):

$$G(z) = \frac{1}{N} \sum_{K=0}^{N-1} z^{-K} \quad (2)$$

where z is the complex variable.

Figure 5:
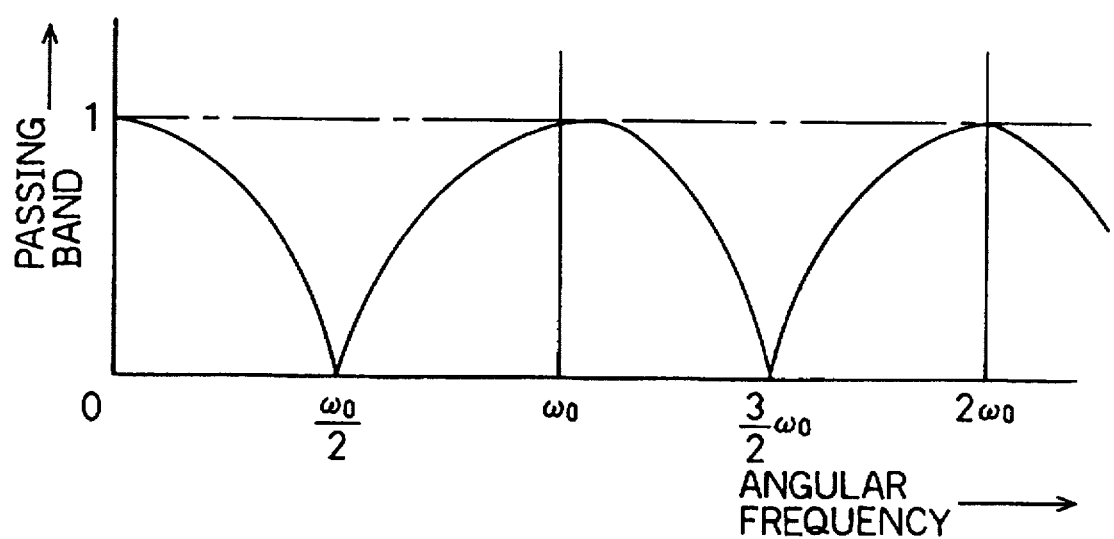
FIG. 5 shows a frequency characteristic of a filter of the motor controller.

Referring now to FIG. 5, there is shown as an example the frequency characteristic of gain of the transfer function of the expression (2) when N=2. As is apparent from FIG. 5, a transmission zero point occurs at an angular frequency $\omega_0/2$ and at frequencies odd times the angular frequency $\omega_0/2$. Here, $\omega_0$ is the sampling angular frequency which is the angular frequency of the FG signal $S_{FG}$.

By such a transmission zero point, the averaging functions as a non-cyclic digital filter, particularly, as a notch filter, and the frequency $\omega_0/2$ at the transmission zero point and the frequency component of the above-mentioned magnetic error coincide with each other, so that the rotation of the motor 1 is not affected by the magnetic error. The necessary number of data for the filtering are not all present after the starting of the motor 1 in a condition where the motor 1 has not made one rotation yet. When all the data are not present as described above, the filter output FGD is not obtained through averaging but an intermediate value processing is performed. The intermediate value processing is to use an intermediate value of values which FGD can take. For example, when FGD can take +128 to −128, the intermediate value 0 is set as FGD.

After such filtering is performed, the ordinal number FGN is incremented by one at step 112 and the speed servo system processing is performed at step 113. The speed servo system processing is the same as the one performed when the absolute value of the error signal FGE is greater than the value A.

Then, at step 114, the phase servo system processing is performed. The phase error signal producer 7 compares the phases of the PG signal $S_{PG}$ and a reference phase signal $S_{PR}$ and transmits a phase error signal $S_{PE}$ to the core 21. The phase error signal $S_{PE}$ and the result of the speed servo system processing are added at a predetermined ratio and the result of the addition is transmitted to the driving circuit 17. Thereby, a phase control system of the motor 1 is constituted. Then, the process returns to step 102 to repeat a similar processing N times.

When the error signal FGE representative of an error generated while the motor 1 makes one rotation is thus stored in the RAM 22, a system controller 23 provided in the video cassette recorder sets the logical value of the external command SL to 1. When SL=1 is inputted to the control processor 20, the process selects step 111 at step 108 to subtract the value (i.e. learning value) of the error signal FGE stored in the RAM 22 obtained one or more rotations before and the newly detected value of the FGE signal, and the result of the subtraction is set as a speed drive data FGD. Since the variation in value of the error signal FGE due to the magnetic error is irrelevant to how many rotations the motor 1 has made, the affect of the magnetic error included in the error signal FGE is removed.

The system controller 23 is set to generate the command SL=1 when the rotational frequency of the drum (cylinder) stabilizes after the starting of the motor 1. Typically, it is two or three seconds after the starting of the motor 1. While the command SL is generated by the system controller 23, a detector which detects that the rotational frequency of the drum stabilizes may be provided to use an output of the detector as the command SL.

While the filtering is simple averaging in this embodiment, it may be moving averaging. Moreover, a notch filter, or a digital filter having an anti-resonant peak may be constituted.

As described above, in the motor controller of the present invention, when learning is used, a speed error due to the magnetic error is removed without any need for filtering. Moreover, it is unnecessary to reduce the gain of the speed control system even at the time of starting, so that a higher speed starting is realized.

Obviously, many modifications and variations of the present invention are possible in light of the above teachings. It is therefore to be understood that within the scope of the appended claims, the invention may be practiced other than as specifically described.

What is claimed is:

1. A motor controller comprising:
   a frequency generator means for generating, in accordance with a rotation of a motor, a predetermined number of pulses every time the motor makes one rotation;
   a counter means for outputting a speed value of the motor by counting reference clocks between pulses supplied from the frequency generator means;
   speed error determining means for determining a speed error of the motor by subtracting the speed value from a predetermined value;
   storing means for storing the speed error at a predetermined address;
   filter means for filtering the speed error so that a speed error component, due to a magnetic error, is eliminated from the speed error;
   a servo means for controlling the motor based on an input speed error;
   control means for operating in three modes, a first mode being a mode in which, when the speed error exceeds a predetermined range, the control means deactivates the filter means and the storing means so that the speed error is directly fed to the servo means, a second mode being a mode in which, when the speed error is within the predetermined range, the control means activates both the filter means and the storing means so that the speed error is first subjected to filtering and then fed to the servo means, and a third mode being a mode in which, when the speed error is within the predetermined range and the speed value is a predetermined value, the control means deactivates the filter means and subtracts from the speed error a speed error that was previously stored in the storing means in the second mode so that a difference between the speed error and the stored speed error is fed to the servo means.

2. A motor controller according to claim 1, wherein said storing means stores a plurality of speed errors in an order in accordance with the pulses from the frequency generator means and reads out the plurality of speed errors in order.

3. A motor controller according to claim 2, wherein said storing means includes counting means for counting the pulses from said frequency generator means, said counting means being reset in accordance with the rotation of the motor.

4. A motor controller as claimed in claim 1, further comprising:
   generating means for generating command signals instructing said second and third modes.

5. A motor controller as claimed in claim 1,
   wherein said filter means performs an averaging operation on speed errors corresponding to a plurality of pulses generated through every rotation of the motor in order to eliminate the speed error component due to the magnetic error.

* * * * *